(12) United States Patent
Luo

(10) Patent No.: US 8,275,075 B2
(45) Date of Patent: Sep. 25, 2012

(54) LOW COMPLEXITY MAXIMUM LIKELIHOOD SEQUENCE DETECTION SYSTEM AND METHODS

(75) Inventor: Jie Luo, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 806 days.

(21) Appl. No.: 12/075,990

(22) Filed: Oct. 25, 2007

(65) Prior Publication Data

US 2008/0212721 A1 Sep. 4, 2008

Related U.S. Application Data

(60) Provisional application No. 60/854,867, filed on Oct. 25, 2006.

(51) Int. Cl.
*H03D 1/00* (2006.01)
(52) U.S. Cl. ........ 375/341; 375/244; 375/350; 375/343; 714/795; 714/796
(58) Field of Classification Search .................. 375/341, 375/350, 224, 343; 714/795, 796
See application file for complete search history.

(56) References Cited

U.S. PATENT DOCUMENTS

| | | | | |
|---|---|---|---|---|
| 6,298,084 | B1 * | 10/2001 | Vinggaard et al. | 375/224 |
| 6,438,180 | B1 * | 8/2002 | Kavcic et al. | 375/341 |
| 7,555,080 | B2 * | 6/2009 | Kim | 375/350 |
| 2003/0016769 | A9 * | 1/2003 | Riess et al. | 375/341 |
| 2005/0002477 | A1 * | 1/2005 | Kajita et al. | 375/341 |
| 2008/0008272 | A1 * | 1/2008 | Yang et al. | 375/341 |

OTHER PUBLICATIONS

Forney, G., "The Viterbi Algorithm," Proc. of the IEEE, vol. 61, No. 3, pp. 268-278, Mar. 1973.
Foschini, G., "A Reduced State Variant of Maximum-Likelihood Sequence Detection Attaining Optimum Performance of High Signal-to-Noise Ratios," IEEE Trans. Inform. Theory, vol. IT-23, No. 5, pp. 605-609, Sep. 1977.
Fincke, U. and Pohst, M., "Improved Methods for Calculating Vectors of Short Length in a Lattice, Including a Complexity Analysis," Math. Comput., vol. 44, pp. 463-471, Apr. 1985.
Swaszek, P. and Jones, W. "How Often is Hard-decision Decoding Enough?," IEEE Trans. Inform. Theory, vol. 44, pp. 1187-1193, May 1998.
Ariel, M., and Snyders, J., "Error-trellises for Convolutional Codes, Part II: Decoding Methods," IEEE Trans. Commun., vol. 47, pp. 1015-1024, Jul. 1999.
Aulin, T., "Breadth-First Maximum-Likelihood Sequence Detection: Geometry," IEEE Trans. Commun., vol. 51, No. 6, pp. 2071-2080, Jun. 2003.
Luo, J. et al., "Fast Optimal and Sub-optimal Any-Time Algorithms for CDMA Multiuser Detection based on Branch and Bound," IEEE Trans. Commun., vol. 52, No. 4, pp. 632-642, Apr. 2004.
Hassibi, B. and Vikalo, H., "On the Sphere Decoding Algorithm I. Expected Complexity," IEEE Trans. Sig. Proc., vol. 53, No. 8, pp. 2806-2818, Aug. 2005.
Vikalo, H., and Hassibi, B., "On the Sphere Decoding Algorithm II. Generalizations, Second-Order Statistics, and Applications to Communications," IEEE Trans. Sig. Proc., vol. 53, No. 8, pp. 2819-2834, Aug. 2005.

* cited by examiner

*Primary Examiner* — Eva Puente
(74) *Attorney, Agent, or Firm* — Kilpatrick Townsend & Stockton LLP

(57) ABSTRACT

A system and method implement low complexity maximum likelihood sequence detection. A decision feedback algorithm computes $x(M+D+L-1)$. Optimality examination is performed for $x(M)$, and state values and values of Markov states along paths from states in $x(M)$ to $xl(M+L)$ are computed.

4 Claims, 4 Drawing Sheets

LOW COMPLEXITY MAXIMUM LIKELIHOOD SEQUENCE DETECTION SYSTEM AND METHODS

RELATED APPLICATIONS

This application claims priority to U.S. Provisional Application Ser. No. 60/854,867, filed Oct. 25, 2006 and titled "Low Complexity Maximum Likelihood Sequence Detection Method", incorporated herein by reference.

BACKGROUND

Consider the scenario where a sequence of vector symbols, with each vector having K binary elements, are sent from a transmitter to a receiver through a vector intersymbol interference (ISI) channel, whose number of taps is L, subject to additive Gaussian noise. Assume the source vector symbols are independently generated with all possible values being equal probable. If the receiver is willing to minimize the probability of sequence detection error, the optimal decision is given by the maximum likelihood (ML) sequence that maximizes the log likelihood function. Finding such sequence is known as the maximum likelihood sequence detection (MLSD) problem.

Conventionally, the ML sequence is computed using the well known Viterbi algorithm (VA), whose complexity scales linearly in the sequence length, but exponentially in the source symbol vector length K, and exponentially in the number of ISI channel taps L. Such complexity can be prohibitive for systems with large KL values. Throughout the past three decades, many attempts have been made to find sequence detectors performing about the same as the VA, but less complex in terms of the scaling law in the Markov states. The main idea considered in these algorithms is to update only a selected number of routes upon the reception of each observation so that the worst case complexity of the algorithm is under control. However, a consequence of such limited search is that none of these complexity-reduction methods can guarantee the ML sequence, which is the sequence that maximizes the log likelihood function. On the other hand, if the length of the input vector sequence, N, is small, one can regard the MLSD problem as a maximum likelihood (ML) lattice decoding problem with an input symbol vector of length NK. Consequently, ML sequence can be obtained using various versions of the sphere decoding algorithm with low average complexity, under the assumption of high signal to noise ratio (SNR). Unfortunately, due to the difficulty of handling a lattice of infinite dimension, these algorithms cannot extend directly to the situation of stream input where the length of the source sequence is practically infinity. In summary, most existing complexity reduction methods for MLSD either cannot guarantee the ML sequence, or are not suitable for stream input.

SUMMARY OF THE INVENTION

Although the VA is computation efficient in the sense of exploiting the underlying Markov chain structure, it does not fully exploit the statistical information of the system. Particularly, the observations of the system are related to the Markov states through a statistic model, which is usually known to the receiver. If the observation perturbation is small, the observation sequence provides a strong inference about the underlying Markov states. Such information can be used to significantly reduce the number of routes one should visit in the VA.

For the communication system of this disclosure, an examination method is provided which guarantees the truncated sequence passing the examination is indeed the truncated ML sequence. As SNR goes to infinity, the examination method becomes highly efficient in the sense of passing the actual truncated source sequence with asymptotic probability one. Together with the help of an asymptotically efficient sequential detector whose probability of symbol detection error is asymptotically zero, the algorithm of the method obtains the ML sequence with an asymptotic complexity of $O(LK^2)$ per symbol. This complexity is, in the scaling order sense, no higher than any of the efficient sequence detectors, including suboptimal ones, that can achieve diminishing symbol detection error as SNR goes to infinity. In the situation of finite-length input sequence, the worst case complexity of the MLSD algorithm is in the same order of the VA.

The new MLSD algorithm of this disclosure is presented in a simple form in order to show clearly the insight of asymptotic complexity reduction. We make no effort in reducing the complexity further as long as the desired asymptotic scaling law is achieved. The proofs of the theorems are presented in a paper titled "On Low Complexity Maximum Likelihood Sequence Detection under High SNR" of U.S. Provisional Application Ser. No. 60/854,867, filed Oct. 25, 2006, incorporated herein by reference.

In one embodiment, a method implements low complexity maximum likelihood sequence detection, including the steps of: computing $x(M+D+L-1)$ using a decision feedback algorithm; performing optimality examination for $x(M)$; and computing state values and values of Markov states along paths from states in $x(M)$ to $x_i(M+L)$.

In another embodiment, a system implements low complexity maximum likelihood sequence detection. A detector captures an input signal. An optimality examiner processes the input signal to determine its optimality, and an advanced decoder analyzes the input signal further if the signal is not determined optimal.

In another embodiment, a method implements low complexity maximum likelihood sequence detection, including the steps of: initializing M=0; using a decision feedback detector to obtain a decision sequence $\{\hat{x}(n)|n\leq D+L-2\}$; computing $\{\hat{x}(M+L-1)\}$ using the decision feedback detector; using an optimality examination method to check whether $\hat{x}(M)=x^{ML}(M)$, based upon $\{\hat{x}(n)|M-D-L+1<n<M+D+L-1\}$; putting $\hat{x}(M)$ in the search list for time M if $\hat{x}(M)=x^{ML}(M)$, and putting possible input symbols in the search list for time M if $\hat{x}(M)\neq x^{ML}(M)$; finding ML sequence using a revised Viterbi algorithm to search symbols in the search list; incrementing M; and repeating the steps of computing, using an optimality examination method, putting 1 to three for M.

DETAILED DESCRIPTION OF THE FIGURES

Figure 1:
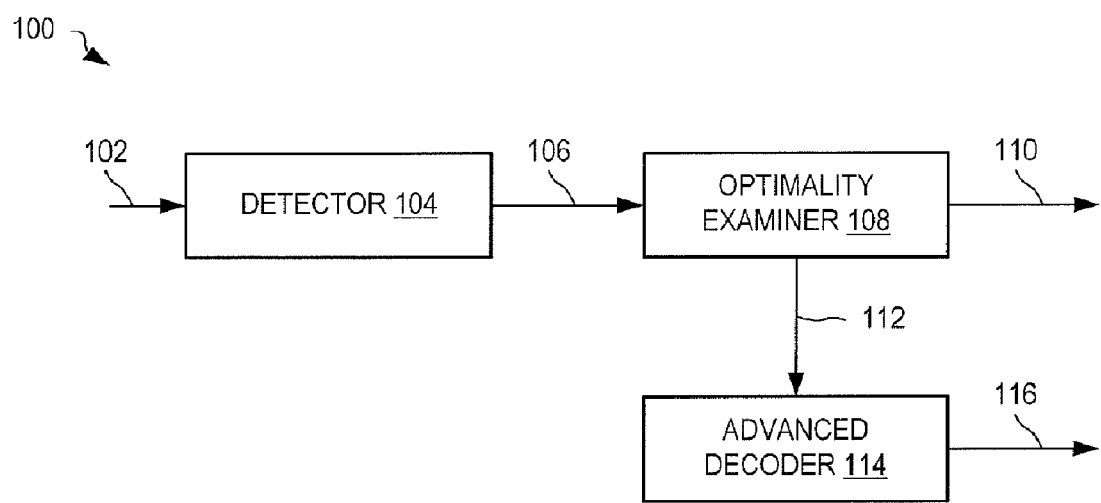
FIG. 1 shows one exemplary system embodiment for low complexity maximum likelihood sequence detection.

FIG. 1 shows one exemplary system for low complexity maximum likelihood sequence detection. An input signal 102 is captured by a detector 104 as signal 106 and passed to an optimality examiner 108. Optimality examiner 108 processes signal 106 to determine its optimality and produces output signal 110 if optimal and intermediate signal 112 if not optimal. Where optimality of signal 106 is not optimal, advanced decoder 114 is used to further analyze signal 106, passed as non-optimal signal 112, to produce output signal 116.

System Model

The following shows assumptions used to model system 100, FIG. 1.

Let $x(0), x(1), \ldots, x(n), \ldots, x(N-1)$ be a sequence of source symbol vectors, each of length K, with binary-valued elements. Let $x_i(n)$ be the $i^{th}$ element of $x(n)$. $x_i(n) \in \{-1, +1\}$, $\forall i, n$. Assume the source vectors are randomly and independently generated, with all possible values being equal probable. The sequence of vectors are then transmitted to the receiver through a vector ISI channel. The $n^{th}$ received symbol vector, also of length K, is given by, $$y(n) = \sum_{l=0}^{L-1} F[l]x(n-l) + v(n). \quad (1)$$

Here $F[l]$, $l=0, \ldots, L-1$ are the channel matrices, each of size K×K with real-valued elements; $v(n)$ is the K length white Gaussian noise vector with zero mean and variance $\sigma^2 I$. We assume all the channel matrices are known to the receiver and are time-invariant throughout the communication. We assume the input sequence length N is large enough to be practically considered as infinity. We also assume $x(n)=0$ for $n<0$ and $n \geq N$.

The following is a key assumption required for the derivation of the results in Sequence Detection section below. A discussion about this assumption is given at the end of Sequence Detection section Assumption 1 We assume the channel matrix $F[0]$ is lower triangular with all its diagonal elements being strictly positive. Define $F(\omega)$ as the vector Fourier transform of the channel matrices, $$F(\omega) = \sum_{l=0}^{L-1} F[l]e^{-j\omega}. \quad (2)$$

Define $\lambda_{min}(A)$ as the minimum eigenvalue of a Hermitian matrix A. Let $F(\omega)^H$ be the conjugate transpose of $F(\omega)$. Define $$\lambda_0 = \min_{\omega \in [0, 2\pi)} \lambda_{min}(F(\omega)^H F(\omega)). \quad (3)$$

We assume $\lambda_0 > 0$.

Define $$\Psi_i(\{x(n)\}) = -\sum_{n=0}^{i} \left\| y(n) - \sum_{l=0}^{L-1} F[l]x(n-l) \right\|^2. \quad (4)$$

We use $\Psi(\{x(n)\})$ to refer to the sum log likelihood function $\Psi_{N+L-2}(\{x(n)\})$ corresponding to the sequence $\{x(n)\}$.

Upon the reception of the observation sequence $\{y(n)\}$, the optimal detection that minimized the probability of sequence detection error is given by the ML sequence.

$$\{x^{ML}(n)\} = \arg \max_{\{x(n)\}, x(n) \in \{-1, +1\}^K} \Psi_{N+L-2}(\{x(n)\}). \quad (5)$$

We are interested in the complexity of the MLSD per symbol, as $\sigma$ goes to zero.

Sequence Detection

The following shows a first theorem for an optimality examination method to verify whether a particular vector in a finite-length truncated decision sequence is identical to the corresponding vector in the ML sequence.

Theorem 1 Given the observation sequence $\{y(n)\}$, let $\{\hat{x}(n)\}$ be a decision sequences. Define $$U_o = \max_{x(i) \in \{-2, 0, +2\}^K, \forall i} \sum_{i=0}^{L-2} \left\| \sum_{l=0}^{i} F[l]x(i-l) \right\|^2. \quad (6)$$

Let $$0 < \delta < \frac{\lambda_0}{L}.$$

Let D be a positive integer satisfying $$D > \frac{2U_0 + \frac{L-1}{L}\lambda_0}{\delta} - \frac{3}{2}L + 2. \quad (7)$$

For any $M \geq L+D-1$, if the following inequality is satisfied for all $M-D<n<M+D+L-1$, $$\left\| y(n) - \sum_{l=0}^{L-1} F[l]\hat{x}(n-l) \right\|^2 < \frac{\lambda_0}{L} - \delta. \quad (8)$$

then $\hat{x}(M) = x^{ML}(M)$ must be true.

The optimality examination method presented in Theorem 1 is asymptotically efficient in the following sense. If $\{\hat{x}(n)\}$ is indeed the actual source sequence, for any $M \geq L+D-1$, the probability of (8) being true for all $M-D<n<M+D+L-1$ goes to one as a goes to zero.

Let $x_L(n) = [x(n-L+1)^T, \ldots, x(n)^T]^T$ be the $n^{th}$ state vector for the underlying Markov chain. $\Psi(\{x(n)\})$ can be computed via the following recursive algorithm.

$$\Psi_M(\{x(n)\}) = \quad (9)$$

$$\Psi_M(x_L(n \leq M)) = \Psi_{M-1}(\{x(n)\}) - \left\| y(M) - \sum_{l=0}^{L-1} F[l]x(M-l) \right\|^2 =$$

$$\Psi_{M-1}(x_L(n \leq M-1)) + \gamma_M(x_L(M-1), x_L(M)).$$

Here $\gamma_M(x_L(M-1), x_L(M))$ is the value of the path connecting Markov states $x_L(M-1)$ and $x_L(M)$.

$$\gamma_M(x_L(M-1), x_L(M)) = -\left\| y(M) - \sum_{l=0}^{L-1} F[l]x(M-l) \right\|^2. \quad (10)$$

We also define $$\Gamma_M(x_L(M)) = \max_{x(n \leq M-L) \in \{-L+1\}^K} \Psi_M(\{x(n)\}). \quad (11)$$

as the value of the Markov state $x_L(M)$. Note that when a state value is obtained, we also obtain the corresponding route in the Markov graph that achieves this value.

Given the observation sequence $\{y(n)\}$ and a decision sequence $$\{\hat{x}(n)\}, \text{ let } 0 < \delta < \frac{\lambda_0}{L}.$$

Let D be a positive integer satisfying $$D > \left\lceil \frac{2U_0 + \frac{L-1}{L}\lambda_0}{\delta} \right\rceil - \frac{3}{2}L + 2.$$

For any $0 \leq M < N$, if for all $M-D < n < M+D+L-1$, we have $$\left\| y(n) - \sum_{l=0}^{L-1} F[l]\hat{x}(n-l) \right\|^2 < \frac{\lambda_0}{L} - \delta.$$

Then $\hat{\chi}(M) = \chi^{ML}(M)$ must be true.

The Simple MLSD Algorithm

The following shows one exemplary maximum likelihood sequence detection (MLSD) algorithm.

The Simple MLSD Algorithm

Initialize $M=0$. Use the decision feedback detector to obtain $\{\hat{\chi}(n)|n \leq D+L-2\}$, where $\hat{\chi}_i(n)$ is given by $$\text{sign}\left( y_i(n) - \sum_{l=1}^{L-1}\sum_{j=1}^{K} f_{ij}[l]\hat{x}_j(n-l) - \sum_{j=1}^{i-1} f_{ij}[0]\hat{x}_j(n) \right). \quad (12)$$

Initialize a Markov state set $X_{-1}$, which contains only the zero state, i.e., $$X_{-1} = \{\chi_D(-1)\}, \chi_L(-1) = [0^T, \ldots, 0^T]^T \quad (13).$$

Let $\hat{\chi}_L(L-1) = [\hat{\chi}(0)^T, \hat{\chi}(1)^T, \ldots, \hat{\chi}(L-1)^T]^T$. Compute the values of the paths connecting $\chi_L(-1)$ and $\hat{\chi}_L(L-1)$; also compute all the values of the Markov states passed by this path.

The algorithm then performs the following three steps recursively for each M.

In step 1, we compute $\hat{\chi}(M+D+L-1)$ using the decision feedback algorithm (12).

In step 2, we carry out the optimality examination for $\hat{\chi}(M)$. The truncated observation sequence and the decision sequence involved in the examination are $\{y(n)|M-D<n<M+D+L-1\}$ and $\{\hat{x}(n)|M-D-L+1<n<M+D+L-1\}$, respectively. We say $\hat{\chi}(M)$ passes the examination if and only if $M \geq L+D-1$ and Inequality (8) holds for all $M-D<n<M+D+L-1$.

If $\hat{\chi}(M)$ does pass the examination, we construct a Markov state set $X_M$ as follows: for all Markov states $x_L(M-1)=[x(M-L)^T, x(M-L+1)^T, \ldots, x(M-1)^T]^T$ in $X_{M-1}$, we let $\chi_L(M) = [\chi(M-L+1)^T, \ldots, \chi(M-1)^T, \hat{\chi}(M)^T]^T$ be a Markov state in $X_M$. We then compute the state value $\Gamma_{M+L}(\hat{\chi}_L(M+L))$.

If $\hat{\chi}(M)$ does not pass the examination, in step 3, we construct the Markov state set $X_M$ as follows: for each Markov state $x_L(M-1) = [x(M-L)^T, x(M-L+1)^T, \ldots, x(M-1)^T]^T$ in $X_{M-1}$, we add the Markov states $x_L(M) = [x(M-L+1)^T, \ldots, x(M-1)^T, x(M)^T]^T$ corresponding to all possible values of x(M) into the Markov state set $X_M$. We then compute the values of all the paths connecting the states in $X_{M-1}$ and the states in $X_M$. We also compute values of all the paths connecting the states in $X_M$ to the Markov state $\hat{\chi}_L(M+L)$. The values for the states in $X_M$ and the state value $\Gamma_{M+L}(\hat{\chi}_L(M+L))$ are computed.

Let $M=M+1$ and repeat the three steps for M. ♦

Since if $\hat{\chi}(M)$ passes the optimality examination, we know $\chi^{ML}(M) = \hat{\chi}(M)$, the ML route must pass one of the Markov states in Markov state set $X_M$ at time index M.

In step 3, when we compute the state value $\Gamma_{M+L}(\hat{\chi}_L(M+L))$, all values of the Markov states along the paths from the states in $X_M$ to $\hat{\chi}_L(M+L)$ are also obtained. Consequently, in step 2, we do not need extra computation to obtain the values of the states in $X_M$ since they are all on the paths from states in $X_{M-1}$ to $\hat{\chi}_L(M+L-1)$. Since the simple MLSD algorithm always compute the values of the Markov states in $X_M$, the values of all the states on the ML path must have been enclosed.

The computation of the simple MLSD algorithm contains three parts.

The first part is the computation to obtain the suboptimal decision sequence $\{\hat{\chi}(n)\}$. This complexity is in the order of $O(LK^2)$ per symbol.

The second part is to carry out the optimality examination for $\hat{\chi}(n)$ (for each n) and update the path values and state values if $\hat{\chi}(n)$ passes the examination. Since we do not perform the examination on any sequence other than $\{\hat{\chi}(n)\}$, by sharing temporary results among successive examinations, the complexity of running the examination is in the order of $O(LK^2)$ per symbol. If $\hat{\chi}(n)$ passes the examination, we need to compute the state value $\Gamma_{n+L}(\hat{\chi}_L(n+L))$. Fortunately, since all paths connecting the states in $X_n$ and $\hat{\chi}_L(n+L)$ pass the Markov state $\hat{\chi}_L(n+L-1)$, whose value has already been obtained in previous steps corresponding to time index n−1. To obtain the state value of $\hat{\chi}_L(n+L)$, we only need to compute the value of the path connecting $\hat{\chi}_L(n+L-1)$ and $\hat{\chi}_L(n+L)$. The overall complexity of the second part is then in the order of $O(LK^2)$ per symbol vector.

The third part is the path values and state values updates when $\hat{\chi}(n)$ does not pass the examination. This part of complexity is in the order of $O(2^{LK})$ per symbol.

System Model

The following shows a second theorem for an optimality examination method to verify whether a particular vector in a finite-length truncated decision sequence is identical to the corresponding vector in the ML sequence.

Theorem 2 Assume the probability of symbol detection error of the decision feedback detector goes to zero as $\sigma \to 0$. If the input sequence is of infinite length, the complexity of the simple MLSD is in the order of $O(LK^2)$ per symbol as σ→0. If the input sequence has a finite length, then the worst case complexity per symbol of the simple MLSD algorithm is in the order of $O(2^{LK})$.

We can conceptually think the MLSD algorithm contains three components. We have an asymptotically efficient suboptimal sequence detector, whose symbol detection error goes to zero as σ→0. We also developed an asymptotically efficient optimality examination method, that can check whether each vector of the obtained sequence is identical to its ML sequence correspondence. If we are unable to tell whether a particular vector is in the ML sequence or not, we use a backup search plan similar to the VA to make sure we do not miss the ML route.

Note that in the VA, a Markov route is eliminated only when it passes the same state at a particular time index with another Markov route, who achieves a lower state value. Therefore, a route comparison in the VA can only disprove, rather than verify, the optimality of a Markov route. In other words, no matter how small the state value is, we cannot say a route indeed gives the truncated ML sequence unless all the survival routes merge naturally. The optimality examination used in the simple MLSD algorithm, on the other hand, can verify, rather than disprove, the optimality of a vector in a truncated decision sequence.

Figure 2:
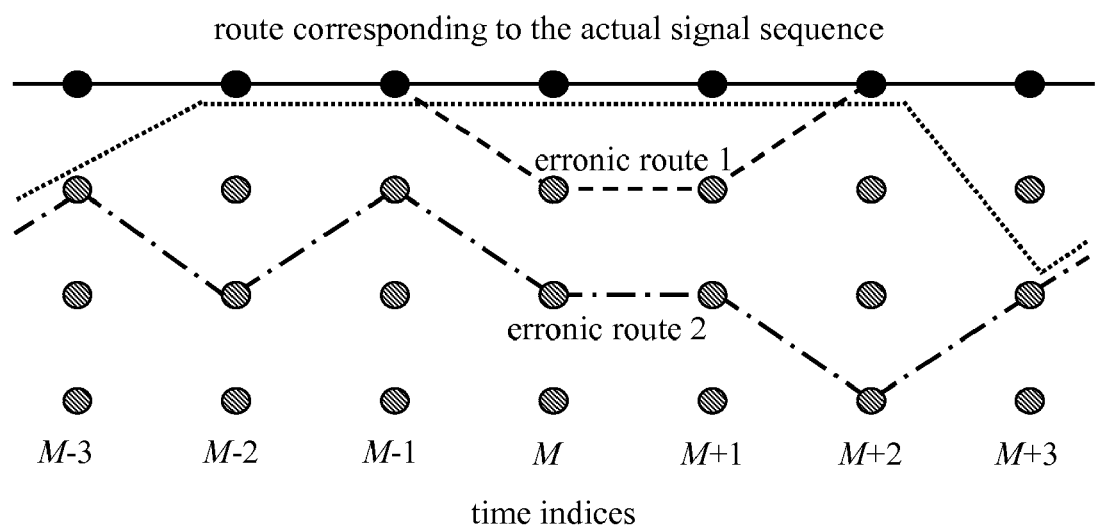
FIG. 2 shows an illustration of an optimality examination in the simple MLSD algorithm.

FIG. 2 provides an illustration of the optimality examination in the simple MLSD algorithm.

The idea of designing the optimality examination method can be explained using the Markov graph illustrated in FIG. 2. Suppose the Markov states corresponding to the actual source sequence are given by the solid dots. We term these Markov states and the paths connecting them the actual states and the actual paths, respectively. We want to check whether the particular state at time index M is optimal, i.e., whether the ML route passes the Markov state illustrated by the solid dot at time index M. Since when the noise power is small, the values of the actual paths are close to zero, while the values of other erronic paths are, in general, significantly lower than zero. If a route does not pass the actual state at time index M, we say it makes a decision error at time index M. Suppose the erronic route merges with the actual route after making several decision errors, as shown by "erronic route 1" in FIG. 2. Due to the fact that all the values of the actual routes are close to zero, the sum log likelihood of the erronic route are usually lower than the sum log likelihood of the actual route. Now, suppose the erronic route does not merge with the actual route after making significant number of decision errors, as illustrated by "erronic route 2" in FIG. 2. We can construct a new route that connects the actual paths to the erronic route, as illustrated by the dotted route in FIG. 2. Although in making such connection, the constructed route also makes several decision errors and hence can have low sum log likelihood value, the value can still be larger than the sum log likelihood of erronic path 2 since the number of decision errors made by erronic route 2 is much more significant.

Note that as long as the probability of symbol detection error of the ML detector can go to zero as σ→0, without requiring Assumption, we can find asymptotically efficient optimality examination method, similar to the one presented in Theorem 1, with a complexity per symbol in the order of $O(LK^2)$. However, if Assumption is not true, finding an asymptotically efficient suboptimal detector with a complexity of $O(LK^2)$ per symbol becomes non-trivial, if not impossible.

Figure 3:
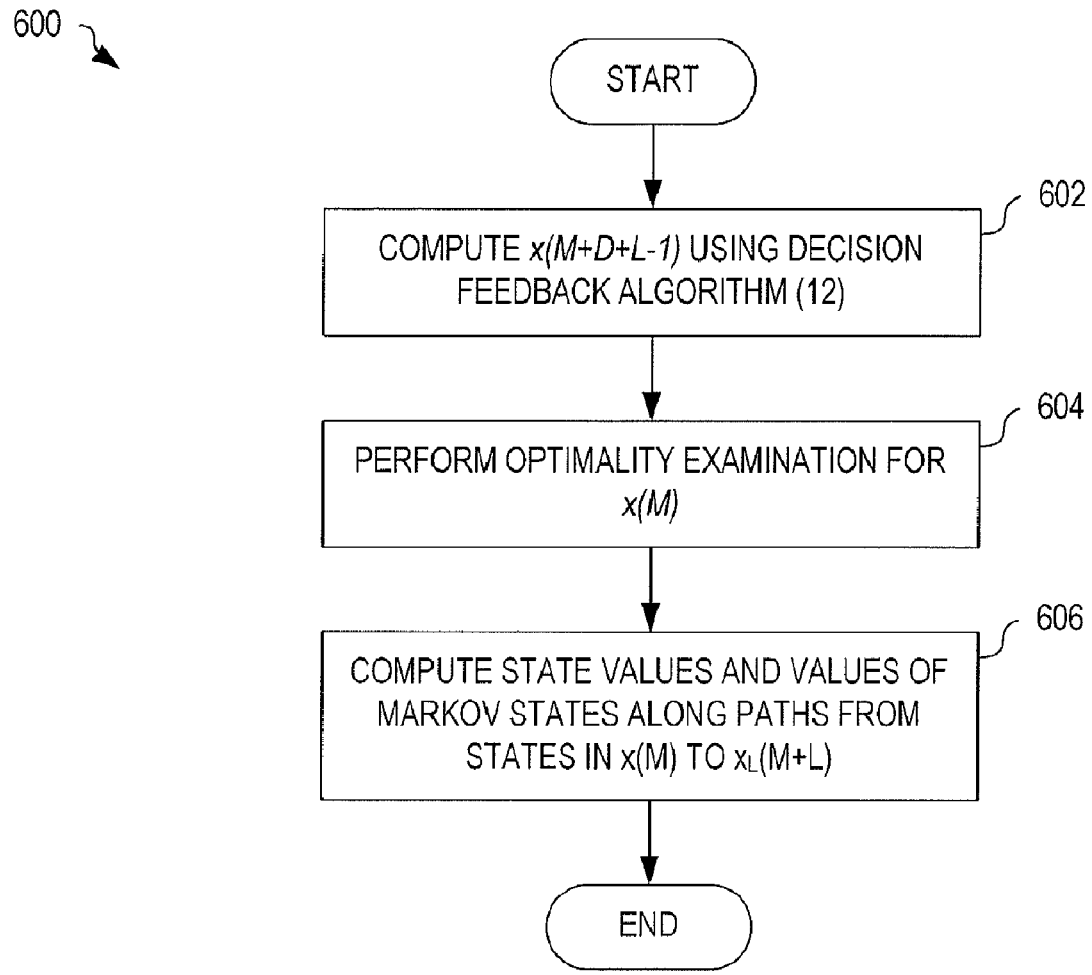
FIG. 3 is a flowchart illustrating one exemplary method for maximum likelihood sequence detection, in an embodiment.

FIG. 3 is a flowchart illustrating one exemplary method 600 for maximum likelihood sequence detection. In step 602, method 600 computes x(M+D+L−1) using decision feedback algorithm (12) shown in above. In step 604, method 600 perform optimality examination for x(M). In one example of step 604, Theorem 1 (discussed above), is utilized to perform optimality examination for x(M). In step 606, method 600 computes state values and values of Markov states along paths from states in x(M) to $x_j$(M+L).

Figure 4:
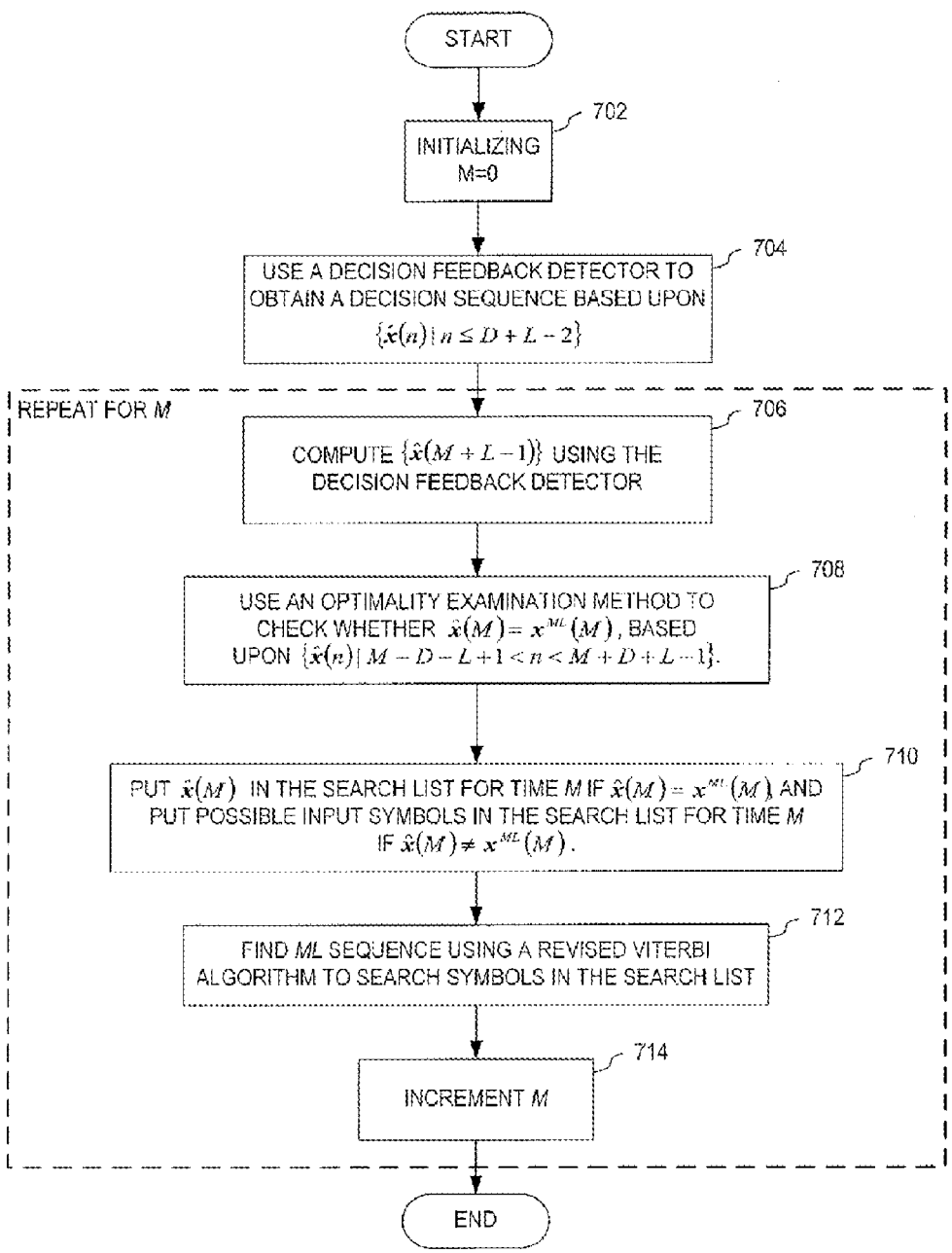
FIG. 4 is a flowchart illustrating one exemplary method for maximum likelihood sequence detection, in an embodiment.

FIG. 4 is a flowchart illustrating one exemplary method 700 for maximum likelihood sequence detection. In step 702, method 700 initializes M to zero. In step 704, method 700 uses a decision feedback detector to obtain decision sequence {{circumflex over {x̂(n)|n≦D+L−2}}. In step 706, method 700 uses the decision feedback detector to compute {x̂(M+L−1)}. In step 708, method 700 checks whether $\hat{x}(M) = x^{ML}(M)$ using the optimality examination method, based on {x̂(n) |M−D−L+1<n<M+D+L−1}. In one example of step 708, Theorem 1 is used as a basis for the optimality examination method. In step 710, method 700 puts x̂(M) in a search list for time M, if x̂(M) passed the examination and puts possible input symbols in the search list for time M, if x̂(M) did not pass. In step 712, method 700 finds ML sequence using a revised Viterbi algorithm to search the symbols in the search list. In step 714, method increments M. As shown, Steps 706-714 repeat for each M.

In considering the maximum likelihood sequence detection (MLSD) problem of transmitting a sequence of binary vector symbols over a vector intersymbol interference channel, it is shown that as the signal to noise ratio (SNR) goes to infinity, the ML sequence can be obtained with a complexity of $O(LK^2)$ per symbol, where L is the number of channel taps and K is the vector length of the source symbol, under certain conditions. Such a complexity is no higher in order than any of the efficient sequence detectors, including suboptimal ones, that may achieve diminishing symbol detection error as SNR goes to infinity.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for low complexity maximum likelihood sequence detection, comprising:
   computing, with a decision feedback detector, x(M+D+L−1) using a decision feedback algorithm, wherein x is a signal sequence, M is a running index of a window center, D is a predetermined constant, and L is a memory parameter;
   performing, with an optimality examiner, optimality examination for x(M); and
   computing state values and values of Markov states along paths from states in x(M) to x(M+L).

2. A system for low complexity maximum likelihood sequence detection, comprising:
   a detector for capturing an input signal;
   an optimality examiner for processing the input signal to determine whether it is optimal, wherein the optimality examiner has a complexity that is polynomial with respect to a memory parameter of the system; and
   an advanced decoder for further analyzing the input signal if it is not determined optimal.

3. A method for low complexity maximum likelihood sequence detection, comprising the steps of:
   (i) initializing M=0, wherein M is a running index of a window center;

(ii) using a decision feedback detector to obtain a decision sequence $\{\hat{x}(n)|n \leq D+L-2\}$, wherein $\hat{x}$ is a signal sequence, D is a predetermined constant, and L is a memory parameter;

(iii) computing $\{\hat{x}(M+L-1)\}$ using the decision feedback detector;

(iv) using an optimality examination method with an optimality examiner to check whether $\hat{x}(M)=x^{ML}(M)$, based upon $\{\hat{x}(n)|M-D-L+1<n<M+D+L-1\}$;

(v) putting $\hat{x}(M)$ in a search list for time M if $\hat{x}(M)=x^{ML}(M)$, and putting possible input symbols in the search list for time M if $\hat{x}(M) \neq x^{ML}(M)$;

(vi) finding maximum likelihood (ML) sequence using a revised Viterbi algorithm to search symbols in the search list;

(vii) incrementing M; and (viii) repeating the steps of (iii) to (vii), using the optimality examination method, putting 1 to three for M.

4. The method of claim 2, wherein the optimality examiner for processing the input signal to determine whether it is optimal determines whether the input signal is equal to a maximum likelihood signal.

\* \* \* \* \*